United States Patent [19]

Chielens et al.

[11] 4,188,077
[45] Feb. 12, 1980

[54] THRUST BEARING FOR TAKING UP AXIAL THRUST OF A ROTATING CYLINDER

[75] Inventors: Alain Chielens, Marcq en Baroeul; Bernard Deschamps, Villeneuve d'Ascq; Gerard Marchal, Hellemmes, all of France

[73] Assignee: Fives-Cail Babcock, Paris, France

[21] Appl. No.: 891,296

[22] Filed: Mar. 29, 1978

[30] Foreign Application Priority Data

Apr. 1, 1977 [FR] France ................................ 77 09879

[51] Int. Cl.² ............................................ F16C 25/02
[52] U.S. Cl. ..................................... 308/135; 308/73; 308/203
[58] Field of Search ................ 308/3 R, 73, 203, 204, 308/5 R, 15, 135, 160, 163, 164, 168–172; 248/130

[56] References Cited

U.S. PATENT DOCUMENTS

| | | | |
|---|---|---|---|
| 2,260,321 | 10/1941 | How | 308/203 |
| 2,447,605 | 8/1948 | Treshow | 308/73 |
| 2,865,690 | 12/1958 | Risse | 308/203 |
| 4,108,410 | 8/1978 | Chielens et al. | 308/73 |

FOREIGN PATENT DOCUMENTS

| | | |
|---|---|---|
| 893433 | 6/1944 | France . |
| 1305034 | 8/1962 | France . |
| 1306693 | 9/1962 | France . |
| 2261443 | 9/1975 | France . |
| 465970 | 1/1969 | Switzerland . |
| 128168 | 6/1919 | United Kingdom . |

*Primary Examiner*—Douglas C. Butler
*Attorney, Agent, or Firm*—Kurt Kelman

[57] ABSTRACT

A thrust bearing comprises a support and a stationary stand, the support being mounted on the stand for pivoting about an axis extending radially with respect to a cylinder rotating about an axis and comprising a ring and bearings supporting the ring for rotation of the cylinder. The ring has two plane faces, one face on each side of the pivoting axis of the support, and bearings are mounted on the pivotal support in a gliding relationship along at least one of the plane faces of the ring.

10 Claims, 7 Drawing Figures

FIG. 2
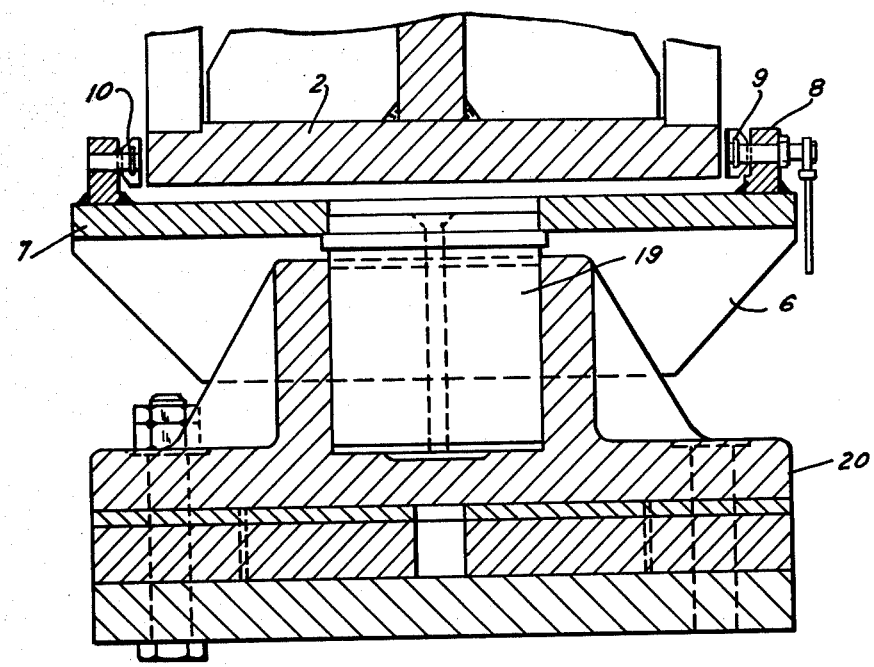
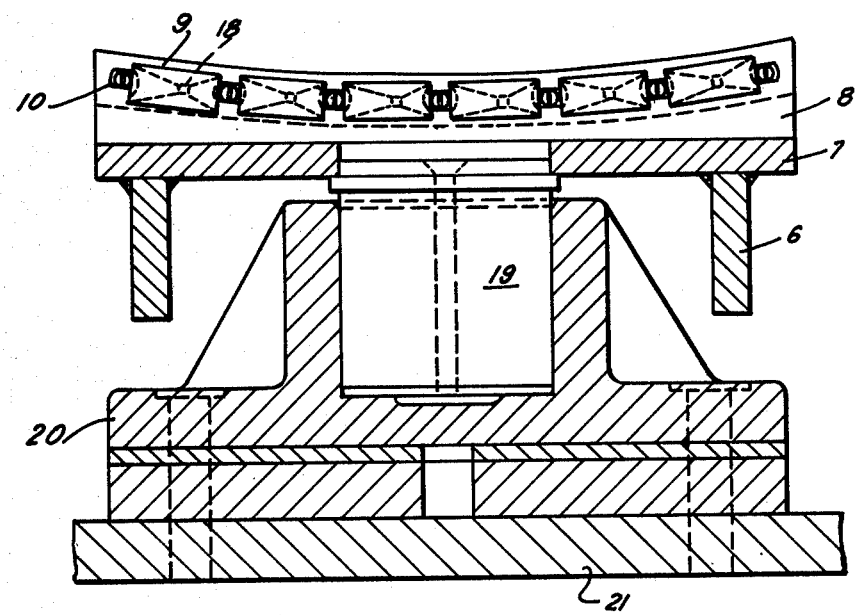
FIG. 3

THRUST BEARING FOR TAKING UP AXIAL THRUST OF A ROTATING CYLINDER

The present invention relates to a thrust bearing device for taking up axial thrust of a cylindrical element of large radius rotating about an axis, such as the rotary cylinder of a crusher, and which element comprises a circumferentially extending ring in gliding contact with bearings supporting the ring for rotation of the cylindrical element.

Bearing supports for grinding mills have been disclosed in U.S. patent application Ser. No. 786,280, filed Apr. 11, 1977, now U.S. Pat. No. 4,108,410 whose entire disclosure as fas as pertinent to this invention is incorporated herein by way of reference, the thrust bearing device of the invention being particularly useful in the grinding mill disclosed and claimed in the prior application.

It has been proposed to absorb the axial thrust of a rotating element by means of a forked bearing mounted on a support and having two branches respectively disposed at the lateral sides of the race constituted by a circumferential bearing ring of the element, each bearing branch being equipped with a bearing gliding along a face of the ring. However, such thrust bearings are not effective in absorbing large axial forces, such as encountered in grinding mills. For this purpose, large bearings have been provided but their effective surface represents only a small portion of the theoretical gliding surface because of deformations under the load of the rotating mill and of the gliding ring thereof. Increasing the number of bearings does not suffice to resolve the difficulties.

It is the primary object of the invention to obviate these difficulties with a thrust bearing device with a plurality of bearings mounted on a pivoting support and movable in different directions in relation to the support.

The above and other objects are accomplished in accordance with the present invention with a thrust bearing device of the indicated type which comprises a support, a stationary stand, the support being mounted on the stand for pivoting about an axis extending radially with respect to the cylindrical element, the ring of the cylindrical element having two plane faces, one face on each side of the pivoting axis of the support, and bearing means mounted on the pivotal support in a gliding relationship along at least one of the plane faces of the ring. The plane faces extend transversely to the axis of rotation of the cylindrical element and receive the axial thrust and transmit it to the support through the interposed bearing means.

The above and other objects, advantages and features of this invention will become more apparent from the following detailed description of certain now preferred embodiments thereof, taken in conjunction with the accompanying drawing wherein FIG. 1 is a partial end view of a cylindrical element supported for rotation about a horizontal axis, taken partially in transverse section and showing the bearing means for the cylindrical elements;

FIG. 2 is an enlarged sectional view of one embodiment of the thrust bearing device, taken in the vertical plane containing the axis of rotation of the cylindrical element;

FIG. 3 is an enlarged sectional view of the thrust bearing device, taken in a vertical plane perpendicular to the plane of section of FIG. 2, i.e. perpendicular to the axis of rotation of the cylindrical element;

Figure 1:
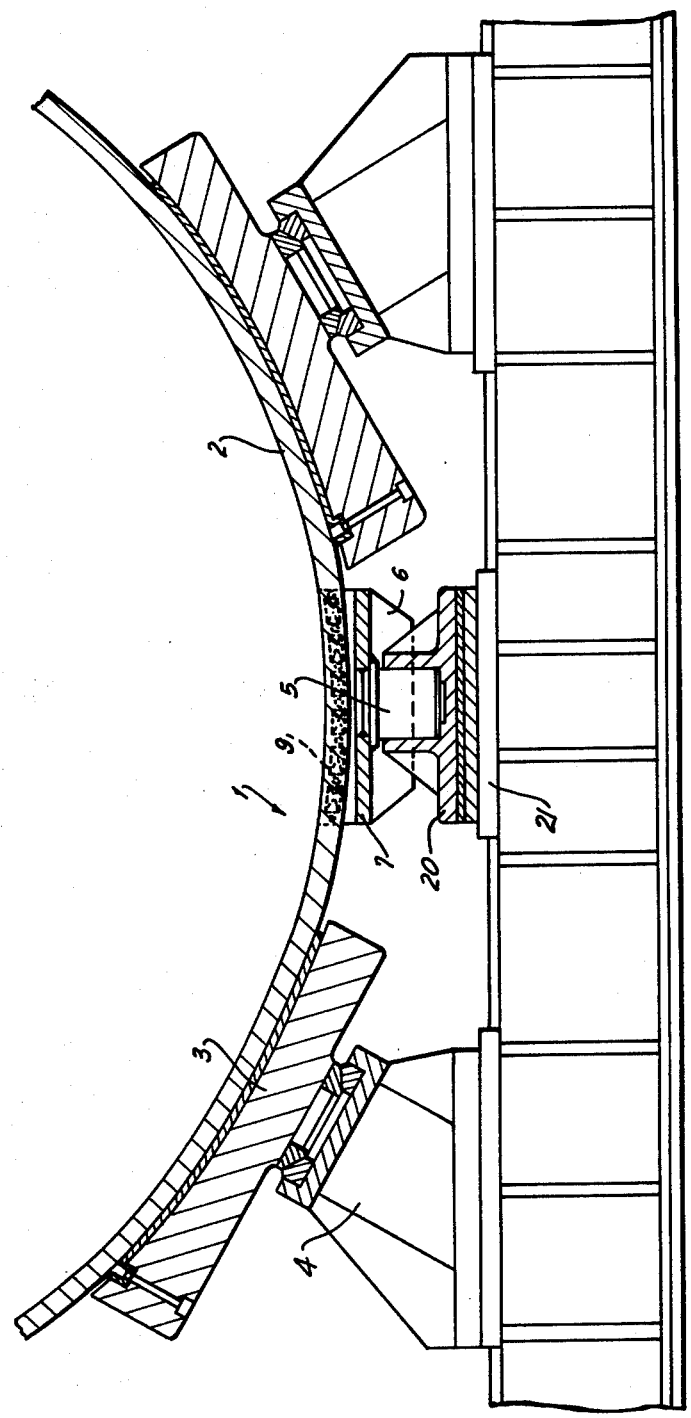

Referring now to the drawing and first to FIG. 1, there is shown the bottom portion of cylindrical element 1 of large radius, for example a tubular grinding mill, comprising ring 2, which is a circumferentially extending bearing rail, and bearing shoes 3 pivotally supported on support bases 4 and supporting bearing rail ring 2 for rotation of cylindrical element 1, all of which in a manner more fully described and claimed in the above-mentioned patent. It should be understood, however, that the thrust bearing device herein described and claimed may be used in conjunction with various bearings supporting the cylindrical element for rotation, for instance roller or other anti-friction bearings, and that the illustrated bearing shoe support serves primarily for purposes of illustration.

The thrust bearing device of the invention has been designated generally at 5 in FIG. 1 and is disposed centrally between bearing shoes 3 in a vertical plane containing the axis of rotation of cylindrical element 1 which is rotated by any suitable means (not shown) about this axis. One embodiment of thrust bearing 5 is illustrated in FIGS. 2 to 5.

As shown therein, thrust bearing device 5 comprises support 6 which includes support plate 7 having two downwardly projecting flanges 7′ and two cheek plates 8 projecting upwardly from the support plate and perpendicular thereto, the flanges and cheek plates being welded to the support plate. The support is mounted on stationary stand 20 which comprises a bearing bushing receiving pivot pin 19 screwed to the support plate and extending radially with respect to cylindrical element 1 whereby support 6 is pivotal on stand 20 in the bearing bushing about an axis extending radially with respect to the cylindrical element. The stand is bolted to base plate 21 for support on a frame on which the grinding mill is mounted.

Bearing rail ring 2 of cylindrical element 1 has two plane faces constituted in the embodiment of FIGS. 2 to 5 by the two lateral edges of ring 2, one face on each side of the pivoting axis of support 6, the plane ring faces being arranged symmetrical with respect to this pivoting axis. The two cheek plates 8 of support 6 are similarly symmetrical with respect to the pivoting axis of the support, face the two plane faces of ring 2 and are spaced therefrom, the plane ring faces and the cheek plates being substantially parallel to each other. Bearing means 9 are mounted on pivotal support 6 in a gliding relationship along the plane faces of the ring in the space between the cheek plates and lateral edges of ring 2. In the illustrated embodiments, the bearing means is comprised of a series of aligned bearings and, as shown in FIG. 3, bearings 9 are preferably arranged in an arc of a circle along the length of the cheek plates.

Figure 4:
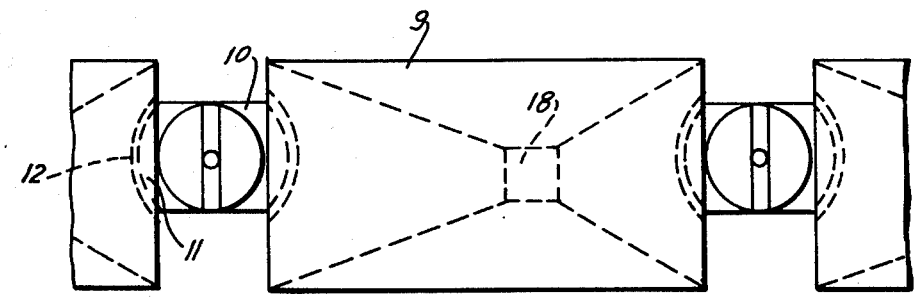
FIG. 4 is an enlarged top view of one of the bearings of the thrust bearing device and of two posts supporting the bearing on the support of the thrust bearing device.

Each bearing 9 is supported on a respective cheek plate 8 of pivoting support 6 by two posts 10 holding a respective bearing therebetween. The posts have diametrically opposed convex bearing portions 11 and bearings 9 have complementary concave bearing portions 12, respective convex and concave bearing portions 11 and 12 engaging each other with clearance therebetween, as best shown in FIG. 4. In this manner, a series of aligned bearings is held in position on each cheek plate in a manner illustrated in FIG. 3.

Figure 5:
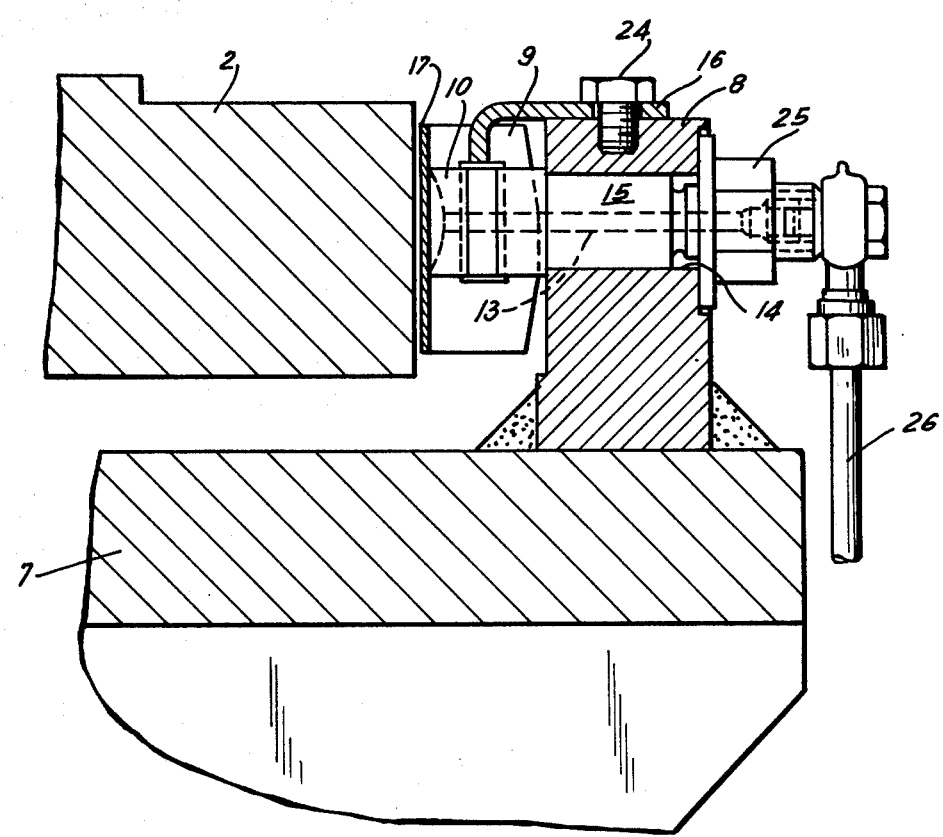
FIG. 5 is a partial sectional view of the thrust bearing device, taken in the plane passing through the axis of the lubricating bore.

As shown in FIG. 5, each post 10 defines axial bore 13 passing therethrough for the flow of a lubricating oil for the bearings. For this purpose, cheek plate 8 has ports 14 to which are attached fittings 25 for supply conduit system 26 delivering lubricating oil to the bearings. Each post 10 comprises stem 15 projecting into port 14 in cheek plate 8 whereon the post is supported, and the post is held in the port by the stem. The post is fixedly positioned on the cheek plate against rotation, for which purpose a positioning tongue 16 has one end clamped to the post while its other end is affixed to cheek plate 8 by screw 24.

As best shown in FIG. 4, each bearing 9 is an elongated body of rectangular shape and has a longitudinal and a transverse plane of symmetry. The bearings are of steel and carry on their gliding face which is in gliding relationship with the plane faces of ring 2 an anit-friction coating 17, the same number of bearings being mounted on each side of the ring. While the anti-friction coating on a substantially plane face of the bearings is in gliding relationship with the plane faces of bearing rail ring 2, each of bearings 9 has a raised portion 18 on its face opposite to the plane face thereof and bearing against the inner face of cheek plate 8 to permit rocking of the bearing with respect to support 6. As clearly shown in FIG. 4, raised portions 18 are offset from the transverse plane of symmetry of bearing 9, preferably by a distance not exceeding one quarter of the length of the bearing. In this manner, the bearings will orient themselves in the interspace between the cheek plates and the plane faces of bearing rail ring 2 in accordance with the requirements of the lubricating oil film in this interspace, this orientation being possible because of the clearance between posts 10 and bearings 9.

As also shown in FIG. 4, support posts 10 are offset from the longitudinal plane of symmetry of the bearings they hold therebetween, which will be advantageous for the proper distribution of lubricating oil over the gliding surfaces of ring 2, particularly if these surfaces are fairly wide. While this offset arrangement is preferred, the support posts may also be arranged in the longitudinal plane of symmetry.

Due to the pivotal mounting of thrust bearing supports 6, the device assures an effective operation of the bearings even if cylindrical element 1 is subjected to considerable thrusts. The bearings and the bearing rail ring will always remain in perfect contact.

Figure 6:
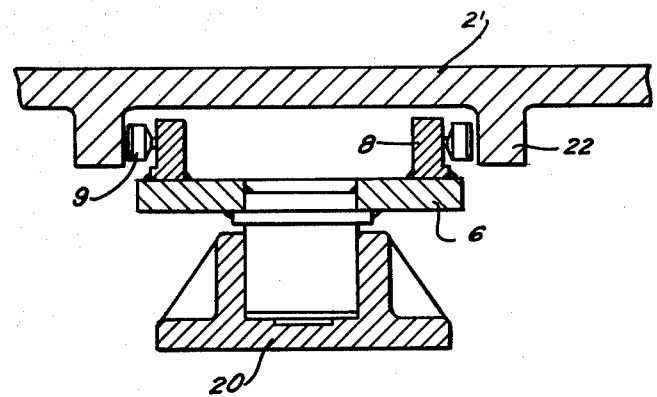
FIGS. 6 and 7 are schematic sectional views similar to that of FIG. 2 and illustrating two additional embodiments.

The embodiment of FIG. 6 differs only in that bearing rail ring 2' has two depending flanges 22 projecting therefrom, the facing surfaces thereof constituting the two plane faces of the ring, and the two cheek plates 8 of pivoting support 6 being arranged between the two flanges. Thus, bearings 9 will be disposed in the interspace between the facing flange surfaces and the outer faces of the cheek plates, the operation of the device being obviously identical to that of the first-described embodiment.

Figure 7:
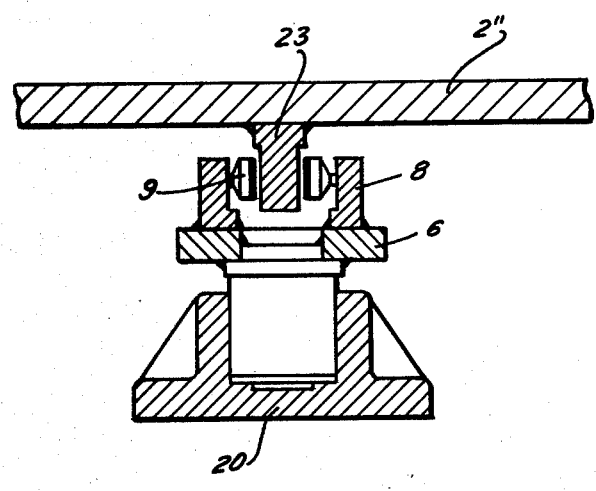

In the embodiment of FIG. 7, ring 2" has a flange 23 welded thereto and projecting therefrom, the opposite surfaces thereof constituting the two plane faces of ring 2" and the two cheek plates 8 being arranged facing the opposite surfaces of flange 23 and spaced therefrom. In other words, flange 23 is centered between the cheek plates and the operation of the device again is the same as that of the embodiment described in connection with FIGS. 2 to 5. In all embodiments, the two plane faces of the bearing rail ring of the cylindrical element are arranged on respective sides of the pivoting axis of support 6, and the bearing means 9 is mounted on the pivotal supports in a gliding relationship along the plane faces of the ring.

Various modifications will occur to those skilled in the art without departing from the spirit and scope of the present invention as defined in the accompanying claims. For instance, bearing means 9 may be provided in cooperation with only one of the plane faces of the ring, particularly if the axis of rotation of cylindrical element 1 is substantially inclined and the axial thrust is, therefore, substantially unidirectional. Also, various bearing and other structural means equivalent to those described and illustrated may be used in the thrust bearing device of the invention.

What is claimed is:

1. A thrust bearing device for taking up axial thrust of a cylindrical element of large radius rotating about an axis, the cylindrical element comprising a ring and bearings supporting the ring for rotation of the cylindrical element, which device comprises a support, a stationary stand, the support being mounted on the stand for pivoting about an axis extending radially with respect to the cylindrical element, the cylindrical element having at least one plane face, and bearing means mounted on the pivotal support in a gliding relationship along each plane face of the cylindrical element, the bearing means comprising a series of bearings arranged in an arc of a circle in gliding relationship with the plane face.

2. The thrust bearing device of claim 1, wherein the cylindrical element has two of said plane faces, one face on each side of the pivoting axis of the support, and the pivoting support comprises two cheek plates facing the two plane faces the series of bearings being mounted on each one of the cheek plates and arranged between each cheek plate and the facing plane face.

3. The thrust bearing device of claim 2, wherein the two plane faces are two lateral edges of the ring and the two cheek plates are arranged facing the lateral edges and spaced therefrom.

4. The thrust bearing device of claim 2, wherein the ring has two flanges projecting therefrom, the facing surfaces thereof constituting the two plane faces of the ring, and the two cheek plates are arranged between the two flanges.

5. The thrust bearing device of claim 2, wherein the ring has a flange, the opposite surfaces thereof constituting the two plane faces of the ring, and the two cheek plates are arranged facing the opposite surfaces of the flange and spaced therefrom.

6. The thrust bearing device of claim 2, wherein the bearing means arranged between each of the cheek plates and plane faces comprises a series of aligned bearings, and further comprising posts supporting the bearings on the cheek plates, the posts having diametrically opposed convex bearing portions and the bearings having complementary concave bearing portions, respective convex and concave bearing portions engaging each other with clearance therebetween, and two of the posts supporting each of the bearings therebetween, and each post defining a bore passing therethrough for the flow of a lubricating oil for the bearings.

7. The thrust bearing device of claim 6, further comprising a stem projecting from each of the posts into a port in the cheek plate whereon the post is supported, the post being held in the port by the stem, and means for fixedly positioning the post on the cheek plate.

8. The thrust bearing device of claim 6, wherein each of the bearings has a longitudinal plane of symmetry and the posts are offset from the plane of symmetry.

9. The thrust bearing device of claim 1, wherein the bearing means is comprised of a series of elongated bearings each having a transverse plane of symmetry, each of the bearings having a raised portions adjacent the pivotal support and permitting the rocking of the bearing with respect to the suppport, and the raised portion of each bearing being offset from the plane of symmetry by a distance not exceeding one quarter the length of the bearing.

10. The thrust bearing device of claim 1, wherein the two plane faces of the cylindrical element are provided on the ring.

* * * * *